United States Patent
Takaoka et al.

(10) Patent No.: US 6,337,464 B1
(45) Date of Patent: Jan. 8, 2002

(54) COMPOSITE MACHINING APPARATUS

(75) Inventors: Tsutomu Takaoka; Syuuji Iizuka, both of Fukui (JP)

(73) Assignee: Matsuura Machinery Co., Ltd., Fukui (JP)

( * ) Notice: Subject to any disclaimer, the term of this patent is extended or adjusted under 35 U.S.C. 154(b) by 0 days.

(21) Appl. No.: 09/366,491

(22) Filed: Aug. 3, 1999

(30) Foreign Application Priority Data

Nov. 26, 1998 (JP) .......................................... 10-335254

(51) Int. Cl.[7] ................................................ B23K 26/02
(52) U.S. Cl. ............................ 219/121.78; 219/121.67; 219/121.65; 219/121.68; 219/121.73
(58) Field of Search ...................... 219/121.78, 121.67, 219/121.72, 121.6, 121.85, 121.65, 121.66, 121.68, 121.69, 121.73

(56) References Cited

U.S. PATENT DOCUMENTS

| | | | |
|---|---|---|---|
| 3,872,626 A | * 3/1975 | White | 51/129 |
| 4,570,907 A | * 2/1986 | Anderson et al. | 266/69 |
| 5,059,759 A | * 10/1991 | Kudo et al. | 219/121.78 |
| 5,911,888 A | * 6/1999 | Girardin | 219/69.11 |

* cited by examiner

Primary Examiner—M. Alexandra Elve

(57) ABSTRACT

A composite machining apparatus which permits a plurality of machining heads to perform different machining operations on a workpiece having a gantry that is capable of moving back having multiple horizontally movable machining heads carried thereon to individually move vertically. Thus, the composite machining apparatus allows the multiple machining heads to perform different machining operations, one after another, on a workpiece placed on the table without moving the workpiece.

5 Claims, 3 Drawing Sheets

COMPOSITE MACHINING APPARATUS

BACKGROUND OF THE INVENTION

The invention relates to a composite machining apparatus that allows multiple machining heads to perform various machining operations one after another on a workpiece placed on a table.

Machining heads that perform machining operations on a workpiece placed on the table are required to be able to move three-dimensionally.

Such three-dimensional motions have conventionally been provided by a combination of a servomotor and a ball screw that moves one machining head back and forth, horizontally and vertically.

This type of conventional machining apparatus that performs different machining operations on the same workpiece by moving only one machining head requires a change-over station to permit transfer of the workpiece from one machining apparatus to another.

Such a change-over station, in turn, usually necessitates a complex transfer mechanism and a complex transfer operation.

This invention solves the above problems in conventional technologies by providing means for individually moving a plurality of machining heads horizontally and vertically, without moving the workpiece placed on the table. The composite machining apparatus according to this invention achieves the desired machining by bringing one machining head after another performing different machining operations into contact with the workpiece which remains stationary.

SUMMARY OF THE INVENTION

This invention offers a solution to the above problems by providing:

A composite machining apparatus having means for individually moving multiple machining heads in a horizontal direction which comprises a bed having a table to place a workpiece thereon, a gantry capable of moving back and forth above the table, having a horizontally extending rail, a linear magnet mounted on the gantry parallel to the horizontal rail, a plurality of machining heads engaged with the horizontal rail each having an individual vertical drive mechanism, and a linear motor drive mechanism to produce a horizontal magnetic field to drive the machining heads along the gantry.

DETAILED DESCRIPTION OF THE INVENTION

For a plurality of machining heads mounted on a single gantry to perform individual machining operations, one after another, on a workpiece placed on a table, it is necessary that the plurality of machining heads move jointly in conjunction with the motion of the gantry and individually along the gantry.

In the embodiment described above, the plurality of machining heads must move jointly back and forth in conjunction with the motion of the gantry and individually in a vertical and a horizontal direction.

In the present invention, the plurality of machining heads move vertically by means of a vertical drive mechanism provided on each of them and horizontally by means of a linear motor drive mechanism comprising a combination of a horizontal linear guide rail mounted on the gantry, engaged with the multiple machining heads, a linear magnet and a device to produce a horizontal magnetic field provided on each of the plurality of machining heads.

The back-and-forth motion of the gantry and the vertical motion of the machining heads in the embodiment can be realized by a combination of a rail provided in the direction of motion and a linear motor drive mechanism or a combination of a servomotor and a ball screw.

The vertical motion of the individual machining heads can also be realized by a combination of a rail provided in the direction of motion and a linear motor mechanism or a combination of a servomotor and a ball screw.

EMBODIMENTS

Figure 1:
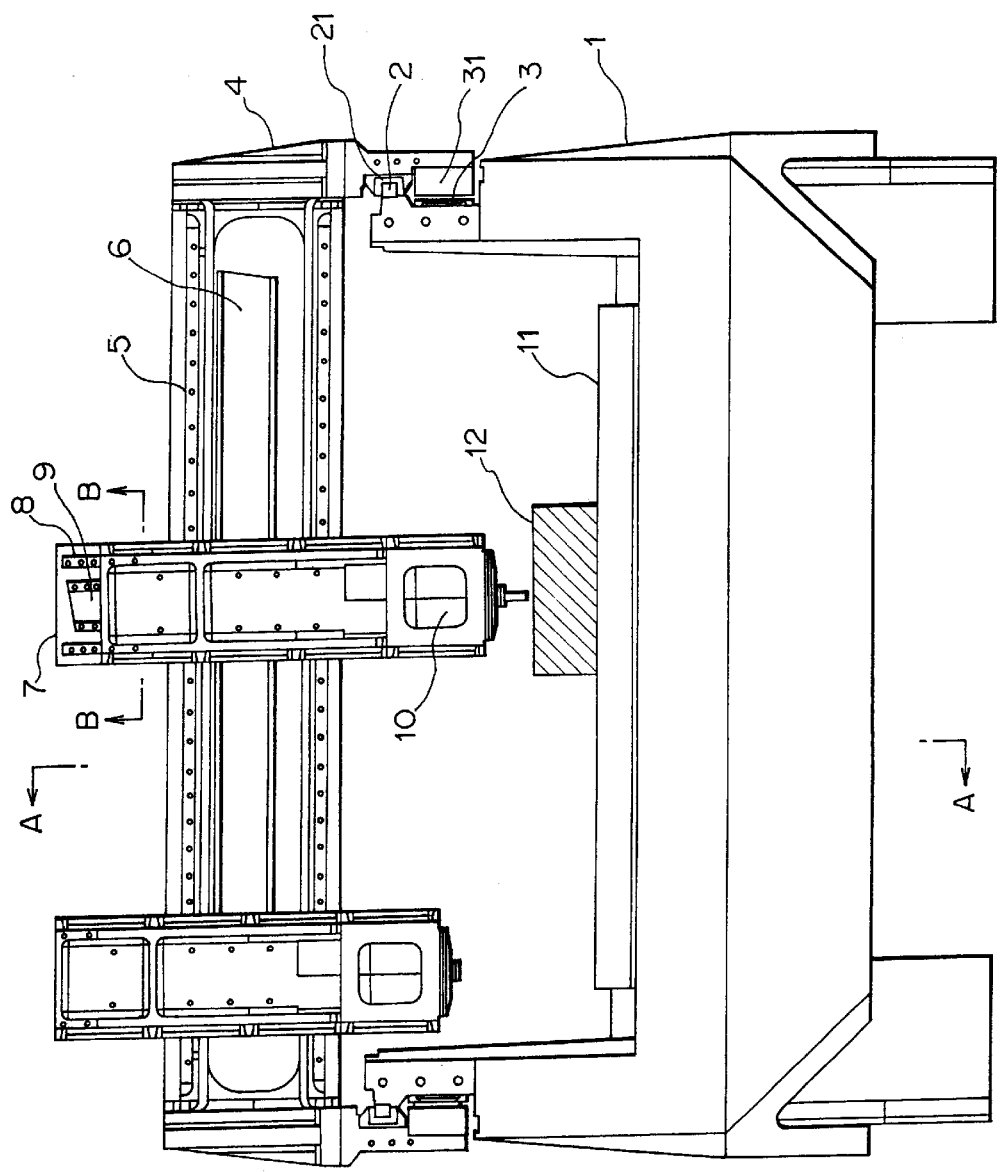
FIG. 1 is a front elevational view of an embodiment of the invention illustrating the gantry and bed assembled, and the machining heads engaged with a horizontal rail on the gantry.
Figure 2:
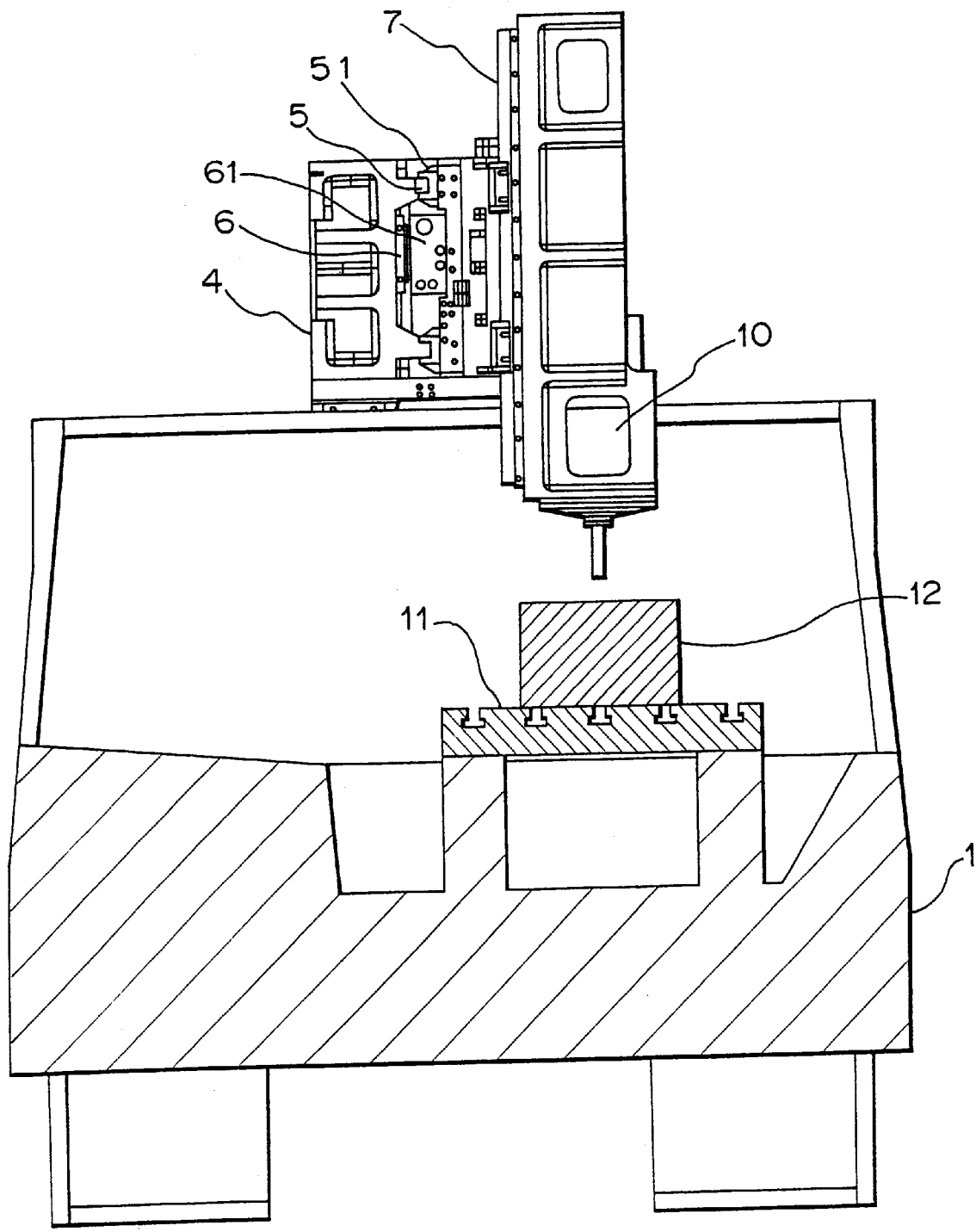
FIG. 2 is a vertical cross-sectional view of the embodiment of FIG. 1 taken along the line A—A illustrating the head base carrying the machining head, mounted on the gantry for horizontal movement.
Figure 3:
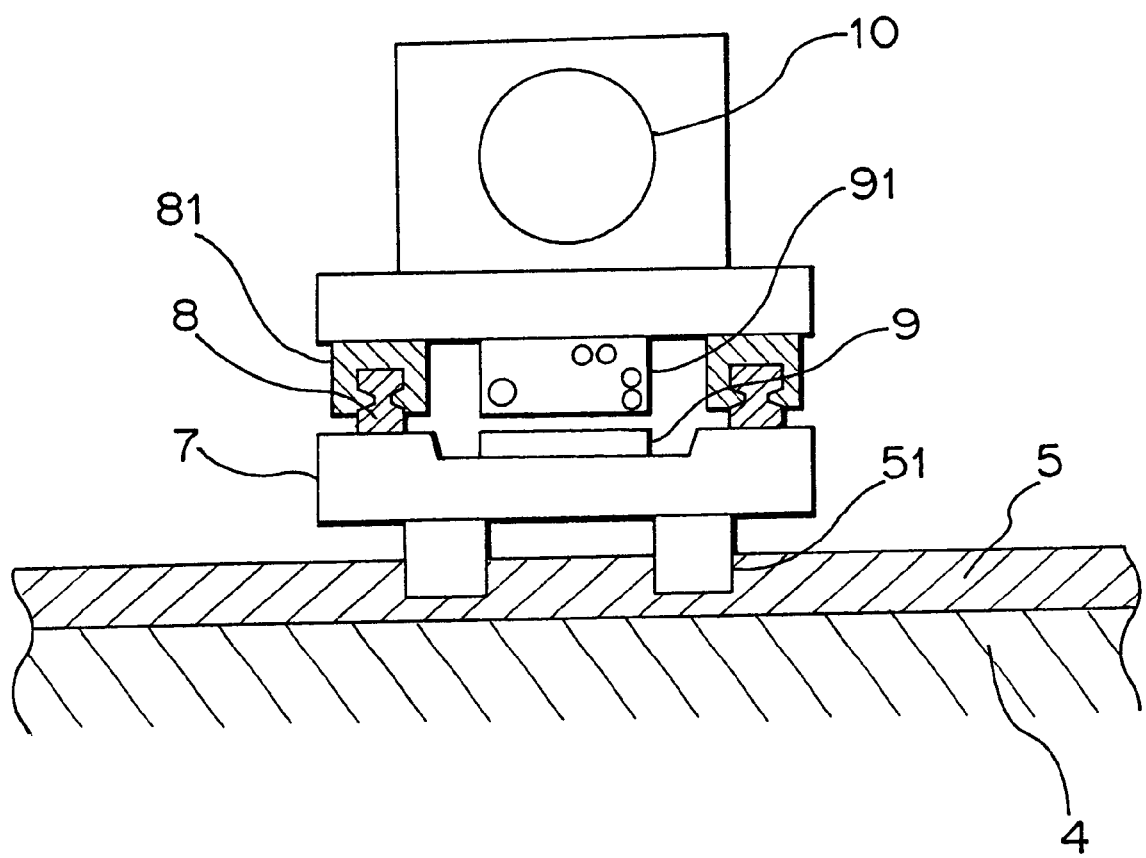
FIG. 3 is a horizontal cross-sectional view of the embodiment of FIG. 1, taken along the line B—B that illustrates the machining head mounted on the head base for vertical movement.

FIGS. 1, 2 and 3 show an embodiment having a plurality of machining head bases 7, each of which carries a machining head 10 and a vertical drive mechanism provided thereon.

The back-and-forth drive mechanism for the gantry of this embodiment comprises linear guide casings 21 extending from front to back and fastened to a gantry 4 and linear guide rails 2 engaged therewith. By passing an electric current to devices 31 to produce a magnetic field in a back-and-forth direction mounted on the gantry 4 so as to face back-and-forth linear motor magnets 3 fastened to a bed 1, a necessary magnetic force is produced between the gantry 4 and the bed 1, thereby producing a driving force to move the gantry 4 back and forth.

The horizontal drive mechanism for the plurality of machining head bases of the embodiment comprises horizontal linear guide casings 51 fastened to the head bases 7 carrying the machining heads 10 that are engaged with a horizontal linear guide rail 5 fastened to the gantry 4, as shown in FIG. 2. Electric current is passed to each of devices 61 to produce a magnetic field in a horizontal direction mounted on each head base 7 facing the horizontal linear motor magnet 6 fastened to the gantry 4, whereby any desired amount of magnetic force is built up between the gantry 4 and the head bases 7 to generate a force to drive each head base 7.

This drive mechanism allows the plurality of head bases 7 (carrying the machining heads 10) to individually move in a horizontal direction along the gantry.

The vertical drive mechanism of the embodiment comprises vertical linear guide casings 8 fastened to the machining heads 10 that are engaged with vertical linear guide rails 81 fastened to each head base 7, as shown in FIG. 3. Electric current is passed to each of devices 91 to produce a magnetic field in a vertical direction mounted on each machining head 10 facing the vertical linear motor magnet 9 mounted on each head base 7, whereby any desired amount of magnetic force is built up between the head bases 7 and machining heads 10 to generate a force to drive each machining head 10.

This drive mechanism allows the multiple machining heads 10 to individually move in a vertical direction.

Various different machining operations can be realized by providing cutting and grinding spindles and laser heads as multiple machining heads.

With the embodiments of this invention, a series of desired machining operations are applied to a workpiece placed on the machining table by bringing one machining head performing the desired operation after another into contact with the workpiece.

This eliminates the need for the change-over means to move the workpiece from one machine to another and all operations to manipulate the change-over means.

As has been described, this invention permits a plurality of machining heads to perform different machining operations on a workpiece without moving the workpiece. Furthermore, it realizes the horizontal motion of the machining heads by means of a combination of a linear magnet and the device to produce a horizontal magnetic field provided on each machining head. The apparatus entails a highly compact system design and considerable cost saving and simpler operations.

This invention is of great value as it significantly increases the efficiency of multiple machining operations performed by a machining apparatus.

What is claimed is:

1. A composite machining apparatus capable of individually moving a plurality of machining heads in a horizontal direction which comprises: a bed comprising a table for mounting a workpiece thereon, a gantry capable of moving back and forth along the table having a horizontally extending rail, a linear magnet mounted on the gantry parallel to the horizontally extending rail, a plurality of machining heads engaged with the horizontal rail, each having an individual vertical drive mechanism and a linear motor drive mechanism comprising means to produce a horizontal magnetic field for interaction with the linear magnet to move each of the plurality of machining heads independently along the horizontally extending rail.

2. A composite machining apparatus according to claim 1 in which at least one of a cutting spindle, a grinding spindle and a laser head comprises the plurality of machining heads.

3. The composite machining apparatus of claim 1 which further comprises: a linear guide casing mounted on the gantry and extending in a direction from the front to the back of the apparatus, linear guide rails mounted on the bed engaged with the linear guide rails and a linear motor drive means mounted on the gantry having a means to produce a magnetic field when electric power is applied to interact with the linear magnet to move the gantry along the bed.

4. The composite machining apparatus of claim 3 wherein the vertical drive mechanism comprises: linear guide rails mounted on a head base engaged with linear guide casings mounted on the machining heads, a vertically arranged linear motor magnet mounted on the head base and a magnetic means mounted on the machining heads to produce a vertical magnetic field when electric current is applied to the magnetic means to move the machining heads in a vertical direction.

5. The composite machining apparatus of claim 1 wherein the vertical drive mechanism comprises: linear guide rails mounted on a head base engaged with linear guide casings mounted on the machining heads, a vertically arranged linear motor magnet mounted on the head base and a magnetic means mounted on the machining heads to produce a vertical magnetic field when electric current is applied to the magnetic means to move the machining heads in a vertical direction.

* * * * *